UNITED STATES PATENT OFFICE.

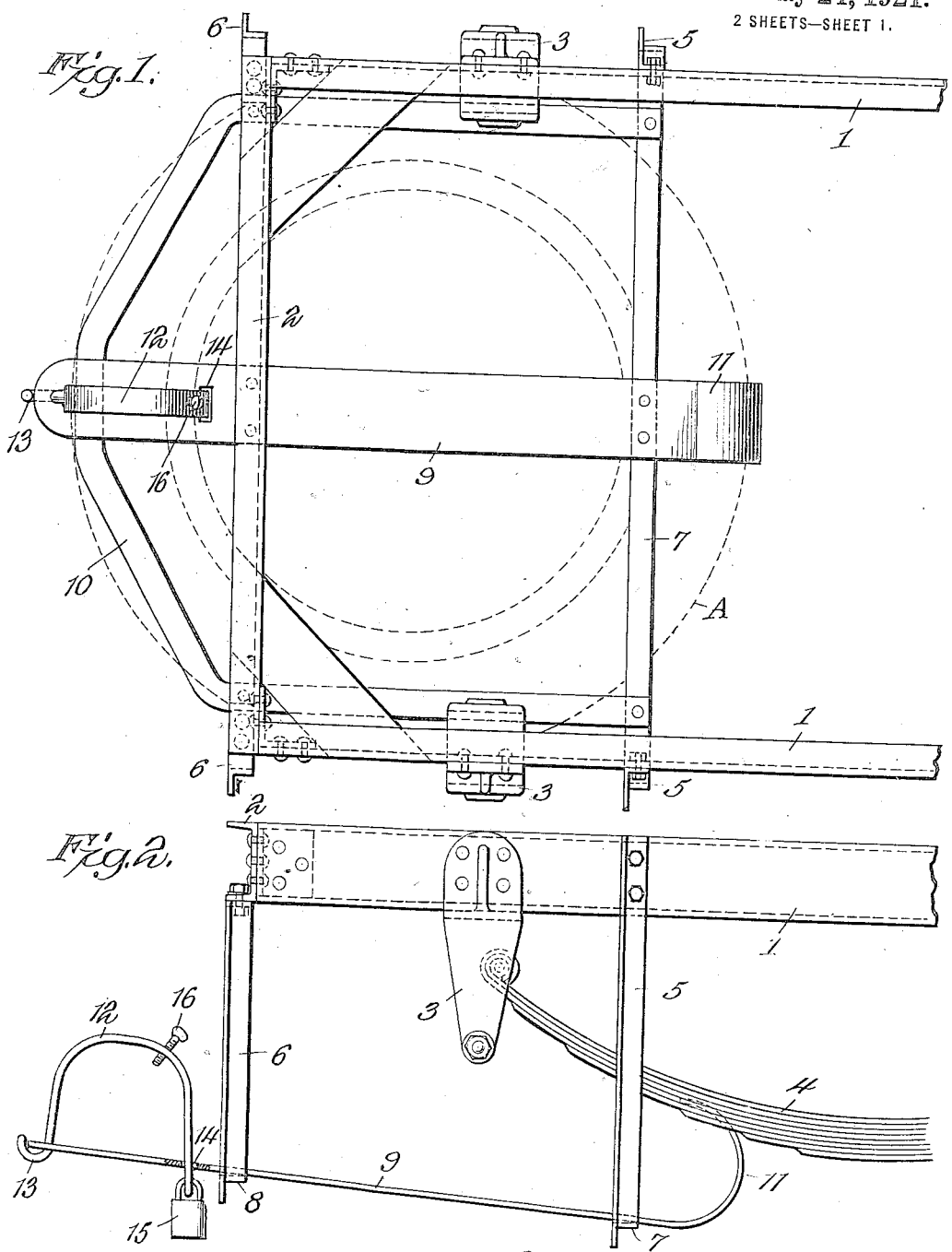

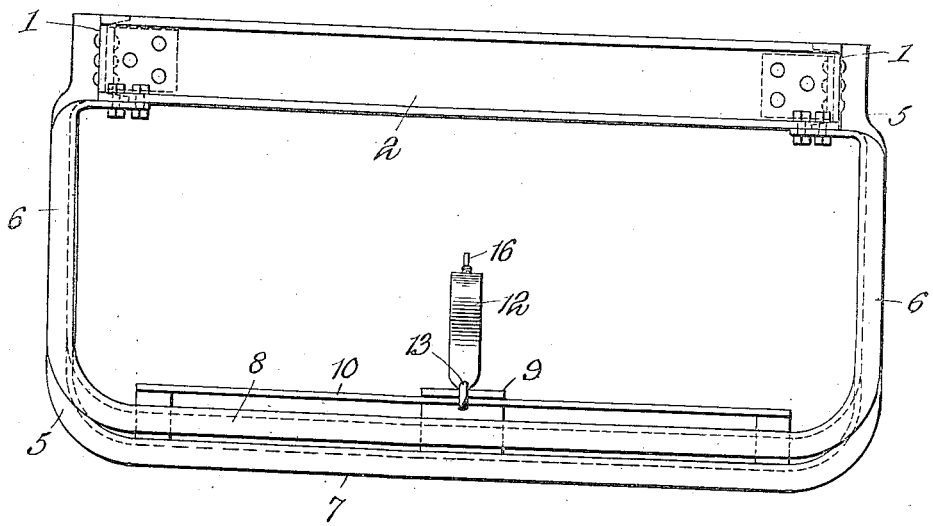
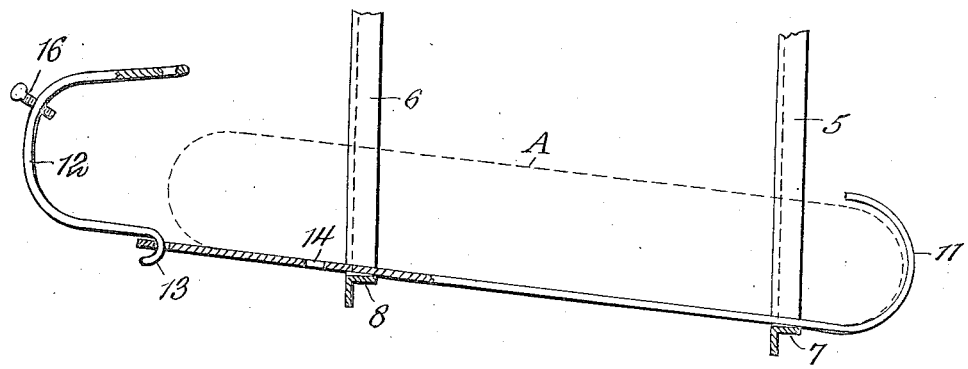

PHILIP FORSCHLER AND ALBERT L. FORSCHLER, OF NEW ORLEANS, LOUISIANA.

TIRE-CARRIER FOR MOTOR-VEHICLES.

1,379,591.   Specification of Letters Patent.   Patented May 24, 1921.

Application filed September 7, 1920. Serial No. 408,767.

*To all whom it may concern:*

Be it known that we, PHILIP FORSCHLER and ALBERT L. FORSCHLER, citizens of the United States, residing at New Orleans, in the parish of Orleans and State of Louisiana, have invented new and useful Improvements in Tire-Carriers for Motor-Vehicles, of which the following is a specification.

Our present invention pertains to motor vehicle accessories, and it contemplates the provision of a device whereby the extra or spare tire that is generally carried on a motor vehicle, may be readily and easily stored and although out of the way, will at the same time be accessible in case of emergency.

The invention further contemplates the provision of a tire or outer casing carrier that may be used for the purpose of carrying an extra tire or casing irrespective of the size of said tire or casing.

The invention further contemplates the provision of a device that may be attached to the under side of a vehicle of any make or size and this with but a slight amount of effort and without the employment of skilled labor.

Similar numerals of reference designate corresponding parts in all of the views of the drawings.

Figure 1 is a top plan view of our novel carrier and illustrating the position assumed by the extra tire or casing in the carrier.

Fig. 2 is a side elevation of the device.

Fig. 3 is a rear elevation of the invention.

Fig. 4 is a sectional view of a portion of the tire-carrying device.

Similar numerals of reference designate corresponding parts in all the views of the drawings.

Our novel device is secured in removable manner on the under portions 1 and 2 of a chassis, and at 3 we have, for the purpose of illustration, shown the usual hanger, and we have also illustrated the spring 4 of a vehicle, in order to clearly demonstrate the exact arrangement of our novel device with respect to a chassis.

Secured to and depending from the chassis in any approved manner, are the carrying members of our novel device, and these members 5 and 6 are U-shaped as illustrated in Fig. 3; the lower portion of the carrying member 5 is numbered 7. Extending from the portion 7 is a rib 9 and said rib is secured to a rail 10 that rests above the lower portion 8 of the U-shaped portion 6.

It will be apparent from Fig. 2 that carrying rib 9 is provided with a tire-guide 11. It will be seen that the portions 7 and 8 of the members 5 and 6 go to make up a strong construction.

On the outer end of the rib 9 we provide an aperture 14 at a point slightly adjacent to where the member 9 is secured to the downwardly reaching portion 6 and where it rests on the member 8 thereof, and at a point slightly beyond this aperture 14 we provide a second aperture for the reception of a bail 12 that has the bent end portion 13 that enters the last named aperture and hence the bail is hinged with respect to the rib 9. The bail 12 is provided at its end with an aperture for the reception of a lock 15 and at a point slightly beyond its center we provide a thumb-screw 16 for a purpose hereinafter set forth.

In the practical use of the invention, the device is secured to the portions 1 and 2 of the chassis or at any other convenient place beneath the vehicle body. The pad-lock 15 is then removed from the bail so as to throw the same in the position shown in Fig. 4 and thus a tire may be placed on the rib 9 until one thread portion rests within the hook portion 11. The bail is then passed through the aperture 14 of the rib 9 and the lock snapped in place. In order to prevent casual displacement of the tire and also overcome objectionable rattle and lost motion the thumb-screw is turned downwardly until it rests against the portion of the tire that is confined within the bail 12.

It will be seen from the foregoing that the rail or brace 10 serves to reinforce the device with respect to the portions 7 and 8.

It will be gathered from the foregoing that a spare tire or casing may be conveniently and securely retained in the rack and this with a slight amount of effort on the part of those practising this invention and notwithstanding its construction our device will add rather than detract from the finished appearance of the motor vehicle.

Such changes in the construction and the relative arrangement of the parts may be made in the future practice of our invention as fairly fall within the scope of the appended claims.

Having described our invention, what we claim and desire to secure by Letters-Patent is:—

1. In a device for the purpose set forth, the combination of downwardly extending portions secured to the under side of the chassis, other downwardly extending portions secured to the rear of the chassis and integral portions extending from one to the other of the series of downwardly extending portions, a rib mounted on the integral portions and having an up-turned inner end and means arranged on the opposite end of the rib for securely fastening a tire thereon; said means comprising a bail that is hinged to the rib and having a portion that passes through an aperture of the rib and a thumb-screw arranged in the bail.

2. In means for the purpose set forth, the combination of downwardly extending arms adapted to be secured beneath a vehicle body, a rack secured on the arms, an aperture provided at the extreme outer end of the rack, a second aperture provided at a point slightly adjacent the first aperture and toward the inner end of the rack and a bail that is hinged to the rack and a thumb-screw arranged on the bail and adapted to bear at its inner end on a casing that is placed on the rack and a reinforcing member that is secured to the downwardly extending arms.

In testimony whereof we have hereunto set our hands in presence of two subscribing witnesses.

PHILIP FORSCHLER.
ALBERT L. FORSCHLER.

Witnesses:
M. G. NUNEZ,
CHAS. P. KERBER.